Patented July 15, 1941

2,249,317

UNITED STATES PATENT OFFICE 2,249,317

POUR POINT DEPRESSANT

Eugene Lieber, Linden, N. J., assignor to Standard Oil Development Company, a corporation of Delaware No Drawing. Application July 14, 1938, Serial No. 219,157

6 Claims. (Cl. 260—505)

The present invention relates to improvements in lubricating oils and more specifically to improved pour point depressants for use therein. The nature of the invention will be fully understood from the following description.

Pour point depressants are made by the condensation of long chain aliphatic compounds, either alone or together with aromatic ring compounds, by means of Friedel-Crafts' catalysts or other catalysts such as Floridan, activated clays and the like. Among the aliphatic compounds, chlorinated hydrocarbon waxes are preferred, although olefins of the type obtained from such chlorinated products may be used as well and other reactive aliphatic compounds such as acids, esters, ketones, aldehydes, alcohols, ethers and the like, which have chains of at least 10 carbon atoms in length, may also be used. By "reactive" group is meant that they have some group such as halogen atoms or olefin bonds permitting them to polymerize or to react with the aromatic ring in the same manner as chlorinated paraffin wax or the olefin derived therefrom are known to react.

As indicated above, the aliphatic material may be used alone, but it is preferred to cause it to react with a suitable aromatic compound which may be a hydrocarbon, for example, naphthalene, anthracene, diphenyl or the like, or a phenolic compound such as phenol, the naphthols, anthrols or cresol. Amines, such as naphthylamines or other aromatic products, such as aromatic esters, ethers, ketones and the like may also be employed. The condensation is carried out preferably using approximately 10 parts of the aromatic compound to about 100 parts of the aliphatic and using aluminum chloride as the catalytic agent. The best reaction conditions vary with the different compounds used, but it appears that temperatures from about room temperature to about 250° F. may be employed. Solvents may be used and these are desirable, although not necessary, and it is preferred to thoroughly agitate the mixture during the reaction period which may be from two to 10 hours and even longer, depending on the temperature and other conditions. It is preferred to hydrolyze the catalyst with water or other hydrolyzing agents after the reaction and then separate the inorganic products of hydrolysis. The low boiling constituents are then distilled off to say 600° F., and the crude depressant is collected as a distillation residue.

Depressants made as above are commercially useful, but it has been found that they may be improved by further treatment with sulfuric acid under certain regulated conditions. Heretofore it has been thought that the acid treatment was undesirable and, indeed, an excessive use of acid may actually decrease pour depressing power, but it has been now found that a moderate use of acids, under conditions which will be set forth below, increases the pour depressing power.

The acid employed in the present process is preferably concentrated sulfuric acid which includes acids of about 90% strength and upward, including fuming acid, the so-called oleums. The amount of the acid is preferably below about 250 grams per liter of the crude depressant produced as described above, although this figure should be taken with some latitude since reaction conditions, such as the amount of the solvent used, the rate of addition of the acid, the intensity of stirring, temperature and time of reaction are important factors controlling the improvement in pour depressor potency obtained and is readily determined by experiment. It is preferred to use a solvent such as a saturated hydrocarbon or a non-reactive chlorinated hydrocarbon such as tetrachlor or trichlor ethane. It is also preferred to thoroughly stir the diluted mixture while the acid is being added gradually in small amounts. The temperature should be regulated so as to prevent rapid rise and preferably should not be allowed to go over about 150° F., during the reaction period and until the acid constituents are separated. In general the temperature of reaction is related to the strength of the acid, the stronger the acid the lower temperatures that are used. The reaction period is ordinarily from two to four hours or somewhat more but, as stated above, all these various factors such as the amount of acid, concentration thereof, temperature, method of adding the acid, degree of agitation and the like, play a part in the result obtained and relative moderate treatment has been found to increase the pour depressing potency. Beyond this, if the treatment is too vigorous either because of the amount of the acid, or concentration is too great, or because the temperature is too high or the reaction too long a period or other reasons which make the reaction too vigorous, there seems to be a reversal and the pour depressing potency again decreases. The success of the method therefore lies in employing these conditions within the ranges specified above. Obviously one or more factors may be varied considerably if suitable compensation is made in other factors and the best procedure is to carry out a few experiments with the particular crude depressant to determine the best set of conditions, bearing in mind the important factor that as the intensity of the acid treatment increases, the pour depressing potency likewise increases to a certain point, and after that further increase gives an opposite effect.

After the acid treatment the product is preferably neutralized with aqueous caustic or ethyl alcohol or naphtha, or kerosene may be added to assist the settling out of the aqueous constituents. The oily materials thus separate from the aqueous layer and the solvent is distilled off to a temperature of about 600° F., leaving the improved depressant as a residue.

Example I

A crude pour depressant was made by mixing 100 parts paraffin wax by weight, which had been chlorinated to 11% Cl content with 5 parts by weight of naphthalene. The material was then taken up in kerosene as a solvent and 2¼% of aluminum chloride was added while stirring, the temperature being maintained at about 88° F. for a period of 5 hours. A mixture of aqueous caustic soda and alcohol was then added to hydrolyze the catalyst and kerosene was also added to dissolve the organic constituents, which were then readily separated from the products of catalyst hydrolysis. The solvent was then distilled up to 600° F., so as to collect a residue which was the crude inhibitor.

To 200 cc. of the crude inhibitor were added 300 cc. of tetrachlor ethane and while vigorously stirring 48 grams of 95% sulfuric acid were slowly added drop by drop. The temperature was noted to rise from about room temperature to 95° F. when the acid had been added, and thereafter rose to a temperature of 110° F., at which it was maintained by cooling for a period of four hours while continuing the stirring. The reaction mixture was then hydrolyzed with aqueous caustic soda, using phenolphthalein as an indicator. 500 cc. of the kerosene were added followed by the addition of 500 cc. of 91% isopropyl alcohol. The entire mixture was then rendered neutral to phenolphthalein by adding a small amount of carbon dioxide. After settling the kerosene extract was washed with brine and then distilled with fire and steam to 600° F. The solvent was taken off overhead and condensed. 86% of the original crude inhibitor was recovered as a residue.

In order to test the pour depressing potency of the crude material and the acid treated product, they were added in different amounts to a wax bearing lubricating oil which was a mixture of a spindle oil and a bright stock. This oil had a pour point of 30° F. When 0.075% of the crude inhibitor was added, the pour point was found to be depressed to −5° F. When the same quantity of the acid treated product was added, the pour point was found to be −10° F. In another test 0.0375% of the crude depressant was added to the same oil and the pour point was found to be +15° F. When the same quantity of the acid treated product was added, the pour point was found to be 0° F.

Example II

A crude pour depressant was prepared by mixing 1200 cc. of chlorinated paraffin wax containing about 11% chlorine with 105 grams of 200 mesh Attapulgas clay. The mixture was vigorously agitated and heated up to 500° F. and maintained thereat for four hours. During this period vigorous evolution of HCl acid was noted. The reaction mixture was cooled and diluted with 1000 cc. of kerosene, then filtered to remove the clay and the filtrate distilled with fire and steam to 600° F., to remove the solvent and unpolymerized wax. A yield of 237 grams of a residue was obtained which corresponded to a yield of 26% based on the original wax.

The pour depressing potency of this product was tested in the oil used in Example I, with the following results:

| | Pour point, °F. |
|---|---|
| Original oil | +30 |
| Original oil +5% chloro-wax polymer | +20 |
| Original oil +10% chloro-wax polymer | +10 |
| Original oil +20% chloro-wax polymer | +15 |

400 cc. of the polymer produced as above were treated with 85 cc. of 95% sulfuric acid, which was added slowly over a period of one hour while the product was maintained in vigorous agitation. The temperature during reaction was held between 80 and 90° F., and stirring was continued for four hours. At the end of this period a 30% aqueous caustic soda solution was added until the mixture was definitely alkaline as indicated by a phenolphthalein indicator. 500 cc. of kerosene and 500 cc. of isopropyl alcohol were then added to the reaction mixture and were brought to the neutral point with $CO_2$. After settling and removal of the aqueous layer, the kerosene extract was washed and distilled with fire and steam to 600° F. 95% of the crude depressant was recovered as a distillation residue.

The pour depressing potency of this material was then determined on the same waxy oil as used before with the following results:

| | Pour point, °F. |
|---|---|
| Original oil | +30 |
| Original oil +5% $H_2SO_4$ treated chloro-wax polymer | 0 |

It will be observed that 5% of this product was decidedly more effective than 20% of the original depressant.

The present invention is not to be limited to any specific type of crude depressant nor to any particular treating conditions, but only to the following claims in which it is desired to claim all novelty inherent in the invention.

I claim:

1. In the process of making pour point depressants which comprises subjecting reactive long chain aliphatic compounds having at least 10 carbon atoms to catalytic condensation and subsequent distillation up to about 600° F. to obtain a residual crude product having pour point depressing properties, the step comprising treating said crude pour point depressing product with sulfuric acid of at least 90% concentration, using below 250 grams of acid per liter of crude depressant, at a temperature between room temperature and 150° F., for about 2 to 4 hours, to increase the pour depressing properties of said product, and distilling the treated condensation product up to about 600° F. to obtain a residue having superior pour point depressing properties.

2. The process of making pour point depressants which comprises chlorinating aliphatic hydrocarbon compounds having at least 10 carbon atoms, condensing the resulting chlorinated aliphatic compounds with aromatic compounds in the presence of a Friedel-Craft catalyst, hydrolyzing and removing the catalyst, distilling the oily condensation products up to about 600° F. to obtain a residual crude product having pour point depressing properties, treating said crude product with sulfuric acid of at least 90% concentration at a temperature not above 150° F., using below 250 grams of acid per liter of crude pour point depressant, in the presence of a non-reactive diluent, for about 2 to 4 hours, neutralizing the reaction products, separating them into an acid layer and an oily layer and distilling the oily layer with fire and steam to about 600° F. to obtain a residue having superior pour point depressing properties.

3. Product of the process defined in claim 1, said product being substantially non-volatile at temperatures below 600° F. and having a substantially greater pour point depressing potency than the crude pour point depressing condensation product used in said process.

4. Product of the process defined in claim 2, said product being substantially non-volatile at temperatures below 600° F., and having a substantially greater pour point depressing potency than the crude pour point depressing condensation product used in said process.

5. The process of making pour point depressants which comprises chlorinating paraffin wax to about 11% chlorine content, condensing about 100 parts by weight of the resulting chlorinated wax with about 5 parts by weight of naphthalene in the presence of about 2¼% of aluminum chloride as catalyst at about 88° F. for about 5 hours, hydrolyzing and removing the catalyst, distilling the oily condensation products up to about 600° F. to obtain a residual crude product having pour point depressing properties, treating said crude product with sulfuric acid of about 95% concentration at a temperature not above about 110° F., using below 250 grams of acid per liter of crude pour point depressant, in the presence of tetrachlorethane as diluent, for about 4 hours, neutralizing the reaction products, separating them into an acid layer and an oily layer and distilling the oily layer with fire and steam to about 600° F. to obtain a residue having superior pour point depressing properties.

6. The process of making pour point depressants which comprises chlorinating paraffin wax to about 11% chlorine content and subjecting the resulting chlorinated wax in the presence of active clay as a condensation catalyst to a temperature of about 500° F. for about 4 hours, separating the resulting condensation product from the clay and distilling it up to about 600° F. to obtain a crude pour point depressing condensation product as distillation residue, treating about 400 volumes of said crude pour point depressing condensation product with about 85 volumes of sulfuric acid of about 95% concentration at about 80–90° F. for about 4 hours, neutralizing the reaction products, separating them into an acid layer and an oily layer and distilling the oily layer with fire and steam to about 600° F. to obtain a residue having superior pour point depressing properties.

EUGENE LIEBER.